(12) United States Patent
Langguth et al.

(10) Patent No.: US 7,019,425 B2
(45) Date of Patent: Mar. 28, 2006

(54) DEVICE FOR NOISE SUPPRESSING OF SMALL ELECTRIC MOTORS

(75) Inventors: Jochen Langguth, Pretzfeld (DE); Kathrin Langguth, Pretzfeld (DE); Michael Sax, Aachen (DE); Valerij Korsuchin, Fürth/Bay (DE)

(73) Assignee: Sintertechnik GmbH, Pretzfeld (DE)

( * ) Notice: Subject to any disclaimer, the term of this patent is extended or adjusted under 35 U.S.C. 154(b) by 0 days.

(21) Appl. No.: 10/896,529

(22) Filed: Jul. 21, 2004

(65) Prior Publication Data
US 2005/0017584 A1    Jan. 27, 2005

(30) Foreign Application Priority Data
Jul. 23, 2003   (DE)   ................. 103 33 719

(51) Int. Cl.
*H02K 11/02* (2006.01)
(52) U.S. Cl. .............. 310/68 R; 310/72; 310/89; 310/220; 310/40 MM
(58) Field of Classification Search .............. 310/68 R, 310/72, 68 C, 89
See application file for complete search history.

(56) References Cited

U.S. PATENT DOCUMENTS

| | | | | |
|---|---|---|---|---|
| 5,723,924 A | * | 3/1998 | Blanchet | 310/85 |
| 5,909,350 A | * | 6/1999 | Anthony | 361/118 |
| 6,037,693 A | * | 3/2000 | Marth et al. | 310/220 |
| 6,078,117 A | * | 6/2000 | Perrin et al. | 310/68 R |
| 6,300,696 B1 | * | 10/2001 | Wong | 310/68 R |
| 6,707,219 B1 | * | 3/2004 | Matsushita et al. | 310/233 |
| 6,717,301 B1 | * | 4/2004 | DeDaran et al. | 310/68 R |
| 6,768,243 B1 | * | 7/2004 | Yamazaki et al. | 310/239 |

FOREIGN PATENT DOCUMENTS

| | | | |
|---|---|---|---|
| EP | 608581 A1 | * | 8/1994 |
| EP | 1294080 A2 | * | 8/2002 |
| JP | 06053075 A | * | 2/1994 |
| WO | 8702840 A1 | * | 5/1987 |
| WO | 3063323 A1 | * | 7/2003 |

* cited by examiner

*Primary Examiner*—Burton Mullins
(74) *Attorney, Agent, or Firm*—Rankin, Hill, Porter & Clark LLP

(57) ABSTRACT

The invention is related to a device for the noise suppression of small electric motors with a $C_x$ capacitor to be installed between two connections (A1, A2) of the small electric motor as well as $C_y$ capacitors installed between each of the connections (A1, A2) and a ground of the small electric motor, wherein the $C_x$ capacitor and the $C_y$ capacitors are combined in a disk-shaped component (1) which can be mounted on a housing cover (13) for the small electric motor or is integrated in the housing cover (13).

17 Claims, 6 Drawing Sheets

DEVICE FOR NOISE SUPPRESSING OF SMALL ELECTRIC MOTORS

Figure 1:
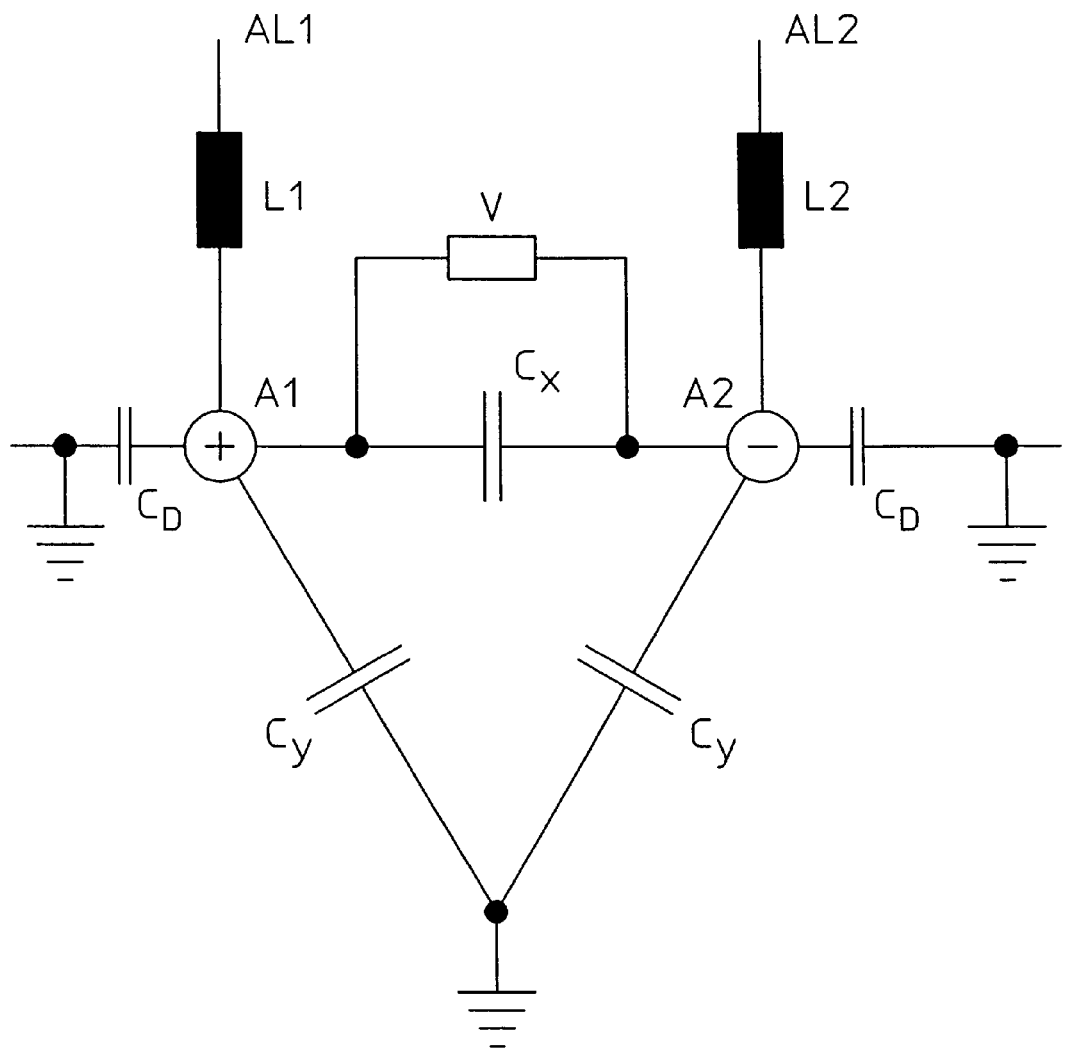

The invention relates to a device as defined in the preamble of claim 1.

Such a device is widely known in accordance with the state of technology.

In accordance with the state of technology combinations of capacitors are used for the noise suppression of small electric motors. For this, so-called $C_X$ capacitors can be installed between the connection clamps used for the power supply of the small electric motor. Moreover, each of the connection clamps can be connected via a so-called $C_Y$ capacitor with ground. $C_X$ capacitors usually have capacitances in the range from 100 pF to 10 µF. The ratio of the capacitance of the $C_X$ capacitor to the capacitances of the $C_Y$ capacitors is usually 10:1. This can vary arbitrarily depending on the type of small electric motor which is to be noise-suppressed.

In addition, inductivities such as bar core inductors for example can be installed in the connection lines for further attenuation of electromagnetic emissions. Moreover, a feedthrough capacitor $C_D$ with which the connection clamps is connected to ground can be attached to each of the connection clamps of the small electric motor. To protect the previously stated capacitors from high-voltage peaks, a voltage-dependent resistor, a varistor on ZnO basis for example, can also be installed parallel to the $C_X$ capacitor. To implement the previously stated noise suppression, it is required a plurality of discrete components be installed on the housing of the small electric motor, preferably on a housing cover holding the connection clamps. This frequently creates space problems particularly with small electric motors with small dimensions. Apart from this, the capacitors designed in the form of discrete components have wires. The wires have their own inductivity which reduces the effect of the capacitors.

For noise suppression of small electric motors it is also known in accordance with the state of technology to mount a capacitor or varistor ring disk directly on the collector. With this an efficient attenuation of both the conducted and the radiated electromagnetic emissions can be achieved. However, the capacitor disk must have a very high capacity. Moreover, the installation effort of such a capacitor disk on the collector is high.

The object of the invention is to remove the disadvantages in accordance with the state of technology. In particular a device is to be specified with which an efficient noise suppression of small electric motors can be achieved in a space-saving manner. In accordance with a further goal of the invention, the setup of the device is to be as simple as possible and easy to mount.

This object is solved by the features of claim 1. Useful embodiments result from the features of claims 2 to 16.

According to the invention it is provided that the $C_X$ capacitor and the $C_Y$ capacitors are combined in a disk-shaped component which can be mounted on a housing cover for the small electric motor or is integrated in the housing cover.

The component preferably in one-piece design can be mounted simply. The wiring of a plurality of components required according to the state of technology is not necessary. The suggested component is particularly space-saving. The disk-shaped component can be designed so that all capacitors, in particular the $C_X$ and $C_Y$ capacitors, are integrated inside.

The component can in particular be part of a plug-in element which can be plugged onto the housing cover. For this, the component can be integrated in a suitable plastic plug-in part. This significantly simplifies mounting. However, the component can also be integrated in the housing cover or permanently installed on its inner or outer side.

The component can have two additional connections for the connection to the electrical connections of the small electric motor. This is particularly advantageous when the component is designed like a plug-in element which can be plugged onto the housing cover. The provision of additional connections makes superfluous a separate contacting of each of the capacitances combined in the disk-shaped component.

The component can be designed as per conventional technologies in the form of a ceramic disk. With this, the disk-shaped component can be designed in accordance with the principle of an barrier layer and/or multi-layer capacitor and/or a varistor with capacitive properties.

In a further embodiment, the component has a central break-through for the leadthrough of a shaft of the small electric motor. In this case, the $C_Y$ capacitors, in particular their ground contacts, are usefully installed near the breakthrough so that they can be contacted with the ground created by the shaft or a bearing holding the shaft. Naturally it is also possible to provide $C_Y$ capacitors at another position on the disk which is located near a mass contact, for example the motor housing. This permits simple and space-saving contacting of the component.

According to a further advantageous embodiment, the component can include feedthrough capacitors $C_D$ to be installed between each of the connections or the additional connections and ground. Moreover, the component can include a voltage-dependent resistor installed parallel to the $C_X$ capacitor, preferably a varistor and/or an ohmic resistor. Also in the previously stated embodiment, the component is made in the form of a preferably one-piece disk.

According to a further embodiment, an inductivity, preferably a bar core inductivity, can be installed between each of the connections or the additional connections and the $C_X$ capacitor. Recesses or pockets in the component can be provided at suitable positions to hold the inductivities.

According to a further embodiment, the component can be attached to an inner or outer side of the housing cover. Particularly when the component is installed on the inner side of the housing cover, this can be effectively protected from mechanical damage and under high-frequency aspects an optimal large-surface connection to the connection ends and/or a brush system provided for current transmission the collector can be implemented.

According to a further advantageous embodiment, the component has additional breakthroughs to lead through connection tags provided on the connections. Moreover, feedthrough capacitors CD may be located in the vicinity of the additional breakthroughs so that they can be contacted with the connection tags leading through the additional breakthroughs. Moreover, a holder for brushes, preferably made of carbon-copper or other precious metal, can be attached mounted to the component. Such an embodied component forms a ready-to-connect module which can be installed without much mounting effort on the housing cover of a small electric motor.

In further accordance with the invention, a housing cover can also be provided on which the device for noise suppression provided by the invention is mounted or in which this device is integrated.

In further accordance with the invention, a small electric motor with a device provided by the invention is provided.

Figure 2:
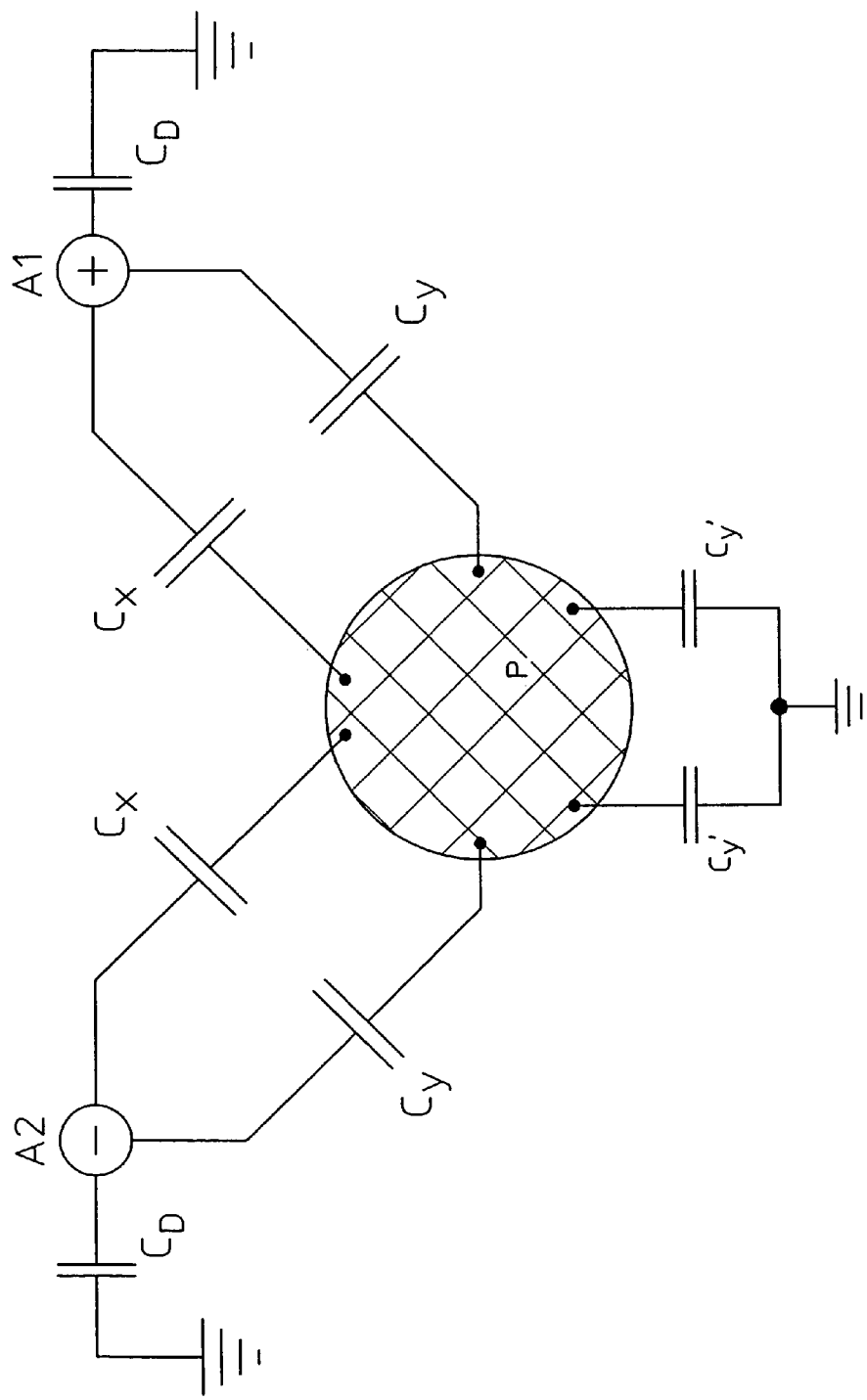
Figure 3:
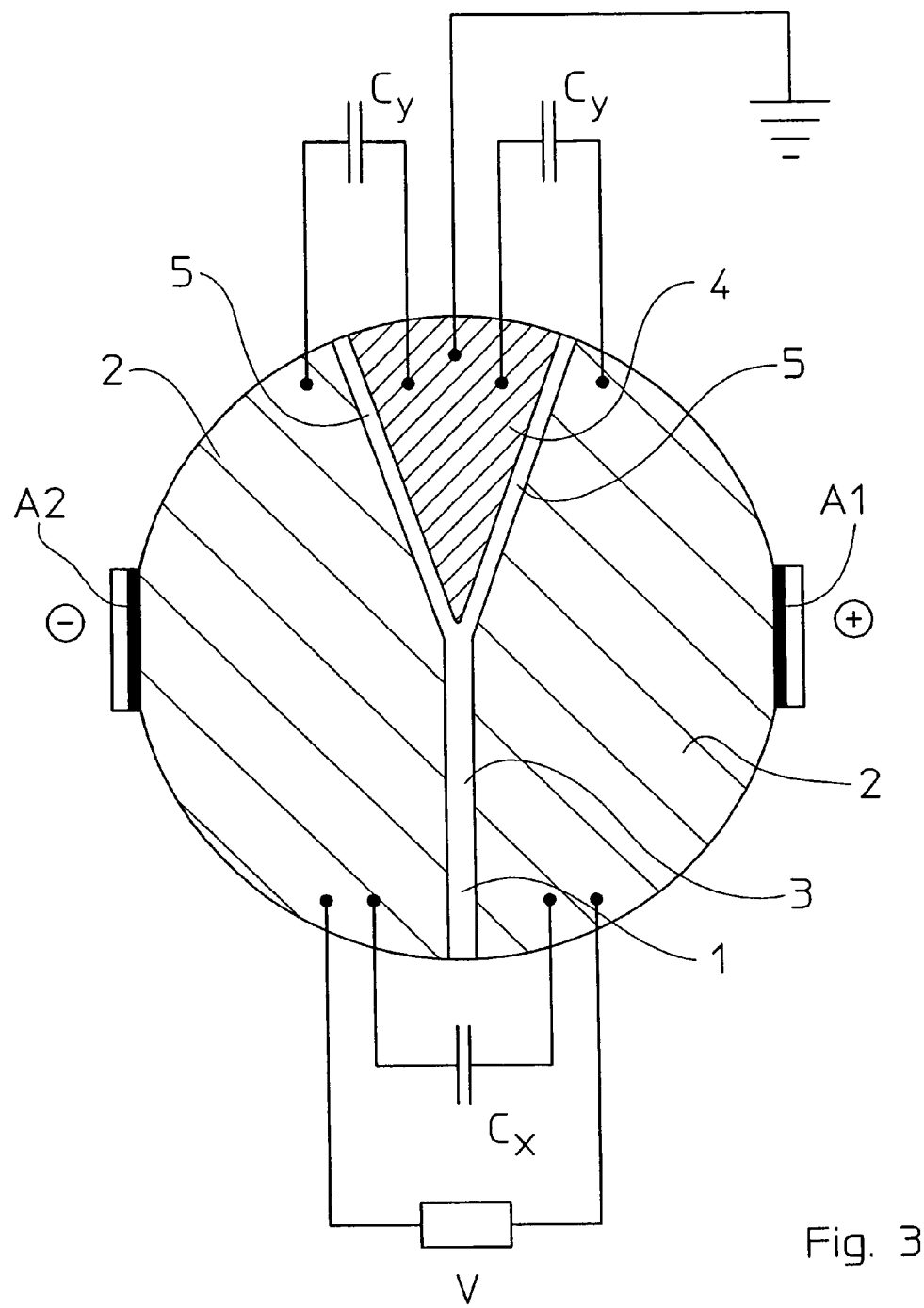
Figure 4:
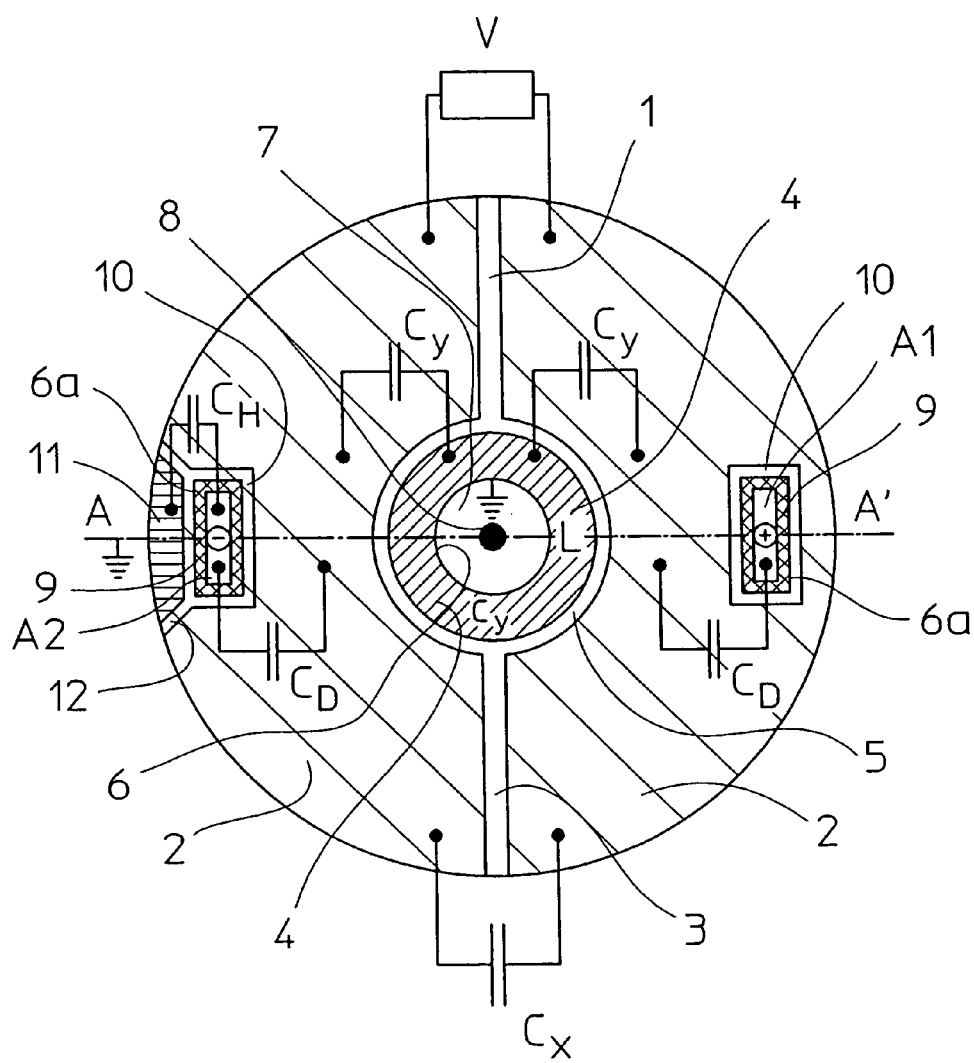
Figure 5:
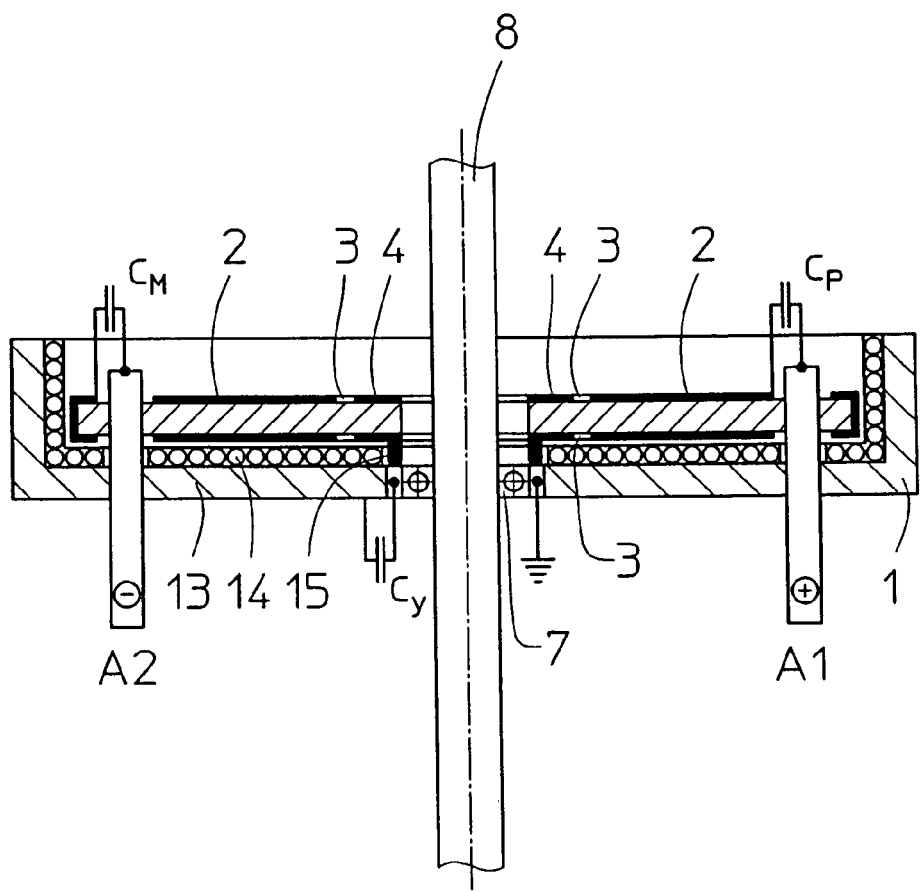
Figure 6:
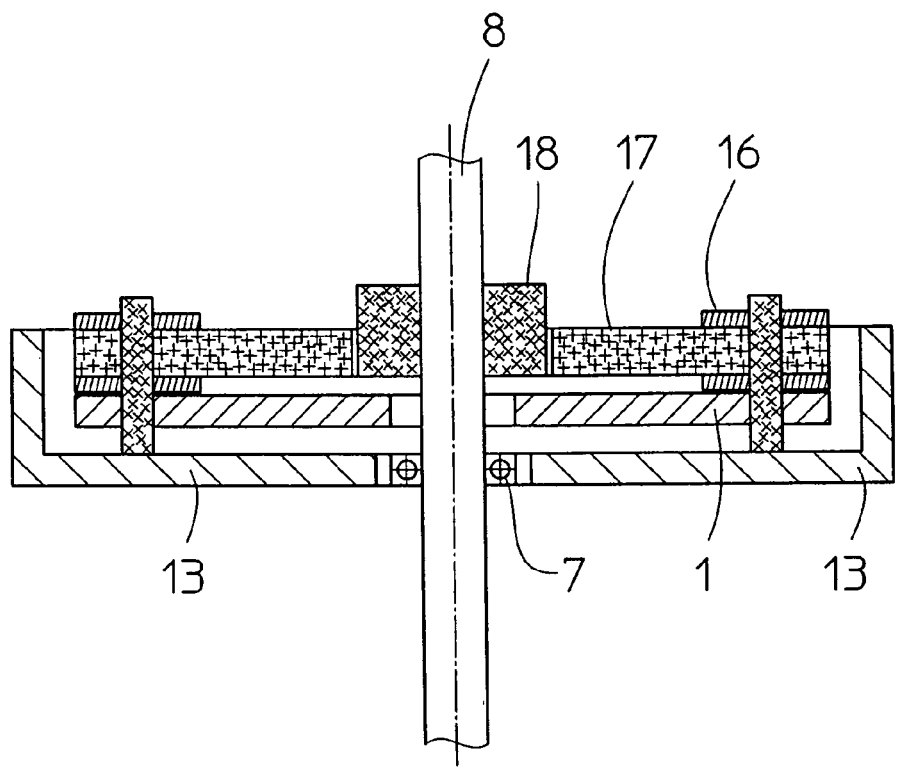

Examples will now be used to describe the invention in more detail based on the drawing. The figures are listed below:

FIG. 1 A first substitute circuit diagram,

FIG. 2 a second substitute circuit diagram,

FIG. 3 a top view of a first component provided by the invention,

FIG. 4 a top view of a second component provided by the invention,

FIG. 5 a schematic, cross-section view in accordance with intersecting line A–A' in FIG. 4 and, FIG. 6 a schematic, cross-section view of a third component.

FIG. 1 shows a first substitute circuit diagram of a circuit for the noise suppression of a small electric motor. A $C_X$ capacitor is installed between connections or connection clamps A1, A2 which are used for the connection of a source of current. Parallel to the $C_X$ capacitor, a varistor V is installed. Instead of or in addition to the varistor V, an ohmic resistor can also be provided. Each of the connection clamps A1, A2 is also connected via a $C_Y$ capacitor with ground. Furthermore, a feedthrough capacitor $C_D$ is allocated to each of the connection clamps A1, A2 which capacitor can also be connected to either ground or also to any surface with a different potential. Inductivities such as for example bar core inductors or bar core inductivities L1, L2 can be installed in the connection lines AL1, AL2 leading to the connection clamps A1, A2.

In the second substitute circuit diagram shown in FIG. 2, each of the connection clamps A1, A2 is connected via a capacitor $C_X$ with an equipotential bonding surface P. Furthermore, each of the connection clamps A1, A2 is connected with ground via a $C_Y$ capacitor and a $C_Y'$ capacitor connected in series with the equipotential bonding surface P. In turn, feedthrough capacitors $C_D$ are provided on the connection clamps A1, A2 which capacitors can be circuited either to ground or a surface with a different potential.

The function of the capacitors $C_X$, $C_Y$, $C_D$ shown as substitutes in FIGS. 1 and 2 as well as of the varistor V and/or of an ohmic resistor is the following:

The capacitors $C_X$ are used for noise suppression in a lower frequency range at approximately 150 kHz. For this purpose a capacitance of the capacitors $C_X$ is in the range from 100 pF to 10 µF. The capacitors $C_Y$ are used for noise suppression in a medium frequency range at approximately 30 MHz. Their capacity is usually one order of magnitude less than that of the capacitors $C_X$. The inductivities L1, L2 and possibly the varistor V are used for noise suppression in a high frequency range starting at 50 MHz. The varistor V and/or the ohmic resistor are/is used to reduce voltage peaks and protects the components from a flashover. The feedthrough capacitors $C_D$ usually surround the connection clamps A1, A2 in the shape of a tube or ring. It is useful that they are made from a material with dielectric properties whose noise-suppression effect remains active up into high frequency ranges of up to 50 GHz. For an noise-suppression effect in lower frequency ranges up to approximately 500 MHz, an HDK ground for example with X7R characteristic for example is sufficient. In the range from 1 to 50 GHz, an NDK ground with for example COG characteristic is sufficient. In the range from 1 GHz to 10 GHz for example, a microwave ceramic or a suitable combination of the previously stated grounds is sufficient. Their capacitance is usually selected lower than that of the capacitors $C_Y$.

Particularly the capacitances shown in the substitute circuit diagrams according to FIG. 1 and FIG. 2 can be a one-piece, disk-type component. In the examples which are described below examples of such components are shown. It is useful that the component is made with multi-layer technology. With this, the capacitances can always be in the form of ceramic barrier-layer capacitors and/or in the form of ceramic, multi-layer capacitors.

FIG. 3 shows a view of the top of a first component provided by the invention. The first component can for example be formed like a ceramic, barrier-layer capacitor. In this case, a disk 1 is made for example from a mixed titanate, for example strontium titanate, barium titanate or another suitable dielectric material. On a upper side of disk 1 are installed two first electrodes 2 which are part of the $C_X$ capacitor. With the first electrodes 2, this can be an electrically conductive layer preferably electrically contactable by soldering or adhesive, which layer is made of silver or burned-in silver for example. The first electrodes 2 are separated from each other by a first isolation path 3. Moreover, a second electrode 4 can be mounted on the upper side which electrode in turn is usefully made of a silver or a burned-in silver layer. The second electrode 4 is separated by second isolation paths 5 from the first electrodes 2. The second electrode 4 takes effect together with the first electrode 2 to form capacitor $C_Y$. One of the connection clamps A1, A2 is connected on the edge to each of the first electrodes 2 to provide as large a surface as possible for electrical contact. The second electrode 4 is connected with ground, for example to the motor housing. The function of the first electrodes 2 as well as the second electrode 4 is shown again in FIG. 3 with substitute circuit diagrams. After this, a varistor V and/or ohmic resistor installed between the first electrodes 2 can also be provided. The varistor V is only shown here as substitute circuit diagram. It can for example be made in the form of a discrete component which is mounted for example as SMD component on the first electrodes 2, or which is a component printed with thick-film technology.

FIGS. 4 and 5 show a second component provided by the invention. With this, a central first breakthrough 6 is provided in a disk 1 made in turn of a dielectric material, for example strontium titanate, barium titanate, NDK grounds (COG and similar), microwave ceramic and similar. The first break-through 6 is surrounded by the second electrode 4 which is shaped like a ring. The first electrodes 2 are separated by the second isolation path 5 from the second electrode 4. Moreover, they are separated from each other by the first isolation path 3. The second electrode 4 has an electrically-conductive connection to a bearing 7 which is held on a motor shaft 8. A connection of the second electrode 4 to ground is provided by the electrically conductive connection of the second electrode 4 with the bearing 7. Moreover, the disk 1 has two second breakthroughs 6A through which the connection clamps A1, A2 are ledthrough. The connection clamps A1, A2 are connected with the disk 1 with a solder 9. The connection clamps 9 are surrounded by a third isolation path 10. The electrode surface created by the connection clamps A1 works together with the first electrode 2 to create the capacitor $C_D$. A third electrode 11 can be provided radially outside which electrode is separated via fourth isolation paths 12 from the first electrode 2. An in so far forming capacitor is designated as $C_M$.

As particularly shown in FIG. 5, the component can be held in a housing cover 13 for a small electric motor which cover is made for example from plastic and whose inner side is provided with a metallization 14. The metallization 14 is used for shielding. Moreover, FIG. 5 shows that both an upper side of the disk 1 and also an under side can be provided with the electrodes 2, 4, 11. A connection of the second electrode 4 with the bearing 7 is suggested with 15.

FIG. 6 shows a schematic cross-section view of a third component. For this, the details of the disk 1 are not shown. On the provided disk 1 is mounted a holder 16 with a large-surface contact for brushes 17 made for example of carbon-copper or precious metal. The brushes 17 are held swivelable in the holder 16 under a preloaded spring (not shown here) so that they are forced to a collector 18 which is permanently connected with the motor shaft 8. Together with the holders 16, the brushes 17 and the housing cover 13, the third component can create a ready-to-mount module.

The device provided by the invention can remove many of the disadvantages in accordance with the state of technology. The component can be designed so that the described capacitors $C_X$, $C_Y$, $C_D$, $C_M$ are integrated in a single disk 1. Even the varistor V and/or an ohmic resistor can be integrated in the disk 1 using the co-firing procedure or thick-film technology when a multi-layer design is selected.

Furthermore, it is useful that the disk has electrically conductive metallization around the outer circumference in the area of the contact points to the connection tags A1, A2 and the housing. The metallization forms the connections of disk 1. Some can have an electrically conductive connection to the electrodes. This provides an additional increase in contact surface which on the one hand has a positive effect on the emission reduction and on the other hand increases the mechanical stability of the contact point.

The component provided by the invention makes it easy to implement the design of the particular capacitance values for the capacitors $C_X$, $C_Y$, $C_D$, $C_M$ by either increasing or reducing the individual surfaces of the electrodes 2, 4, 11. This also produces either an increase or reduction of the capacitance values. With the barrier-layer capacitors, this is produced by the change in size of the particular electrode areas on the surface. With multi-layer design, this is produced by the change of the particular electrode surfaces provided inside the disk 1. These inner electrode surfaces are separated by the dielectric material, wherein the electrodes which belong together can be contacted with each other at useful positions of the outside of the disk 1, for example in the area of connection clamps A1, A2 or in the area of the second break-throughs.

With multi-layer design, the capacitance of the disk 1 can be set to almost any value with the sum of the individual surfaces of the electrodes 2, 4, 11. Using an appropriate variation of the surfaces of the electrodes 2, 4, 11, an appropriate ratio of $C_X$ to $C_Y$ is created, wherein the capacitances can be varied in the range from 1 pF to 10 µF. However, reasonable values are 10 µF to 1 µF for $C_X$ and 1 nF to 500 nF for $C_Y$. Dielectric materials can be used which are effective up to frequencies of 50 GHz. Dielectric grounds, for example ceramic grounds with HDK and/or NDK properties such as for example dielectric grounds of type X7R, Y5V, NP0, COG or also microwave ceramics. With a microwave ceramic, a particularly good reduction of emissions in very high frequency ranges can be expected and can if necessary even replace the bar core inductors.

For reasons of space, the geometry of the component should be adapted to the particular circumstances of a motor. It is preferably smaller than the outer circumference of the small electric motor. An advantage is that the disk 1 can be adapted to the geometric circumstances of the housing cover and thus an optimal utilization of the surface can also be implemented. Furthermore, the geometry can be specified so that a large-surface contact of the carbon-copper or precious-metal brushes can be implemented which is optimal for high-frequency ranges. A lower surface of the holder 16 can be soldered flush directly to a contact surface of the disk 1. This can reduce the electromagnetic emissions in the area of the coal brushes 17 for all frequency ranges. Furthermore, this can also reduce spark generation and thus achieve a longer lifespan of the small electric motor.

According to an embodiment, the component can also be placed in a plastic housing which is attached externally to the housing cover 13. Such a, preferably plug-in, plastic housing can be contacted over a large surface with the connection clamps A1, A2 provided thereon and the housing. Instead of the many individual contact points with the individual components, in this case there is a total of only 3 contact points: Two contacts with the electric connection tags A1, A2 of the small electric motor and one with the ground. Furthermore, the bar core inductors L1, L2 can be integrated in such a plug-in attachment.

The disk 1 provided by the invention can be combined with an noise-suppression disk on collector 18 so that an optimal reduction of the electromagnetic noise can be implemented for all frequency ranges. When a further housing cover is also electrically-conductively layered on the opposite side of the housing cover 13, a further optimized suppression of electro-magnetic noise can be expected.

REFERENCE DESIGNATION LIST

1 Disk
2 First electrode
3 First isolation path
4 Second electrode
5 Second isolation path
6 First breakthrough
6a Second breakthrough
7 Bearing
8 Motor shaft
9 Solder
10 Third isolation path
11 Third electrode
12 Fourth isolation path
13 Housing cover
14 Metallization
15 Connection
16 Holder
17 Carbon-copper brush
18 Collector
A1, A2 Connection clamps
AL1, AL2 Connection line
$C_X$, $C_Y$, $C_D$, $C_M$ Capacitors
L1, L2 Inductivities

The invention claimed is:

1. A device for noise suppression of small electric motors with a $C_x$ capacitor to be connected between two connections (A1, A2) of the small electric motor as well as $C_y$ capacitors to be connected between each of the connections (A1, A2) and a ground of the small electric motor, wherein
the $C_x$ capacitor and the $C_y$ capacitors are combined in a disk-shaped component (1) which can be mounted on a housing cover (13) for the small electric motor or is integrated in the housing cover (13),
wherein the component (1) is designed as a ceramic multi-layer element having breakthroughs for leading through the connections (A1, A2), and
wherein feedthrough capacitors $C_D$ are formed between each of the connections (A1, A2) and ground.

2. The device as defined in claim 1, wherein the component (1) is part of a plug-in element which can be plugged onto the housing cover (13).

3. The device as defined in claim 1, wherein the component (1) has two additional connections for connection to the connections (A1, A2) of the small electric motor.

4. The device as defined in claim 3, wherein an inductivity is installed between each of the connections (A1, A2) or the additional connections and the $C_x$ capacitor.

5. The device as claimed within claim 4, wherein the inductivity is a bar core inductivity.

6. The device as defined in claim 1, wherein the component (1) has a central breakthrough (6) for the leadthrough of a shaft (8) of the small electric motor.

7. The device as defined in claim 6, wherein the $C_y$ capacitors are installed near the breakthrough (6) so that they can be contacted with the ground created by the shaft (8) or a bearing (7) holding the shaft (8).

8. The device as defined in claim 1, wherein the component (1) includes a voltage-dependent resistor (v) installed parallel to the $C_x$ capacitor.

9. The device as claimed within claim 8, wherein the voltage-dependent resistor (v) is a varistor.

10. The device as defined in claim 1, wherein the component (1) is attached to an inner or an outer side of the housing cover (13).

11. The device as defined in claim 1, wherein the component (1) is attached to a conductive layer (14) which is attached to an inner side of the housing cover (13).

12. The device as defined in claim 1, wherein the component (1) has additional breakthroughs (6a) to lead through connection tags provided on the connections (A1, A2).

13. The device as defined in claim 12, wherein the feedthrough capacitors $C_D$ are located in the vicinity of the additional breakthroughs (6a) so that they can be contacted with connection tags leading through the additional breakthroughs (6a).

14. The device as defined in claim 1, wherein a holder (16) for brushes (17) preferably made of carbon-copper or precious metal is attached to the component (1).

15. The device of claim 1 further comprising a housing cover for a small electric motor permanently attached thereto.

16. The device of claim 1 further comprising a small electric motor.

17. A device for noise suppression of small electric motors with a $C_x$ capacitor to be connected between two connections (A1, A2) of the small electric motor as well as $C_y$ capacitors to be connected between each of the connections (A1, A2) and a ground of the small electric motor, wherein
the $C_x$ capacitor and the $C_y$ capacitors are combined in a disk-shaped component (1) which can be mounted on a housing cover (13) for the small electric motor or integrated in the housing cover (13),
the component (1) has two additional connections for connection to the connections (A1, A2) of the small electric motor, and
wherein the component (1) is designed as a ceramic multi-layer element having breakthroughs for leading through the connections (A1, A2), whereby feedthrough capacitors $C_D$ are formed between each of the two additional connections and ground.

* * * * *